US008301285B2

(12) United States Patent
Zhang et al.

(10) Patent No.: US 8,301,285 B2
(45) Date of Patent: Oct. 30, 2012

(54) COMPUTER AIDED SOLID STATE BATTERY DESIGN METHOD AND MANUFACTURE OF SAME USING SELECTED COMBINATIONS OF CHARACTERISTICS

(75) Inventors: Xiangchun Zhang, Ann Arbor, MI (US); Yen-Hung Chen, Ann Arbor, MI (US); Chia-Wei Wang, Ypsilanti, MI (US); Ann Marie Sastry, Ann Arbor, MI (US)

(73) Assignee: Sakti3, Inc., Ann Arbor, MI (US)

( * ) Notice: Subject to any disclaimer, the term of this patent is extended or adjusted under 35 U.S.C. 154(b) by 0 days.

(21) Appl. No.: 13/285,373

(22) Filed: Oct. 31, 2011

(65) Prior Publication Data

US 2012/0046776 A1  Feb. 23, 2012

(51) Int. Cl.
 *G06F 19/00* (2006.01)
(52) U.S. Cl. .......................................... 700/97; 700/117
(58) Field of Classification Search .................. 700/97, 700/98, 17
See application file for complete search history.

(56) References Cited

U.S. PATENT DOCUMENTS

| | | | |
|---|---|---|---|
| 2,862,646 | A | 12/1958 | Hayford et al. |
| 4,009,052 | A | 2/1977 | Whittingham |
| 4,648,347 | A | 3/1987 | Aichert et al. |
| 4,854,264 | A | 8/1989 | Noma et al. |
| 4,933,889 | A | 6/1990 | Meshkat et al. |
| 5,338,625 | A | 8/1994 | Bates et al. |
| 5,367,465 | A | 11/1994 | Tazawa et al. |
| 5,377,118 | A | 12/1994 | Leon et al. |
| 5,402,366 | A | 3/1995 | Kihara et al. |
| 5,411,592 | A | 5/1995 | Ovshinsky et al. |
| 5,453,934 | A | 9/1995 | Taghavi et al. |
| 5,498,489 | A | 3/1996 | Dasgupta et al. |
| 5,571,749 | A | 11/1996 | Matsuda et al. |
| 5,751,591 | A | 5/1998 | Asada |
| 5,906,757 | A | 5/1999 | Kong et al. |
| 6,016,047 | A | 1/2000 | Notten et al. |
| 6,294,479 | B1 | 9/2001 | Ebe et al. |
| 6,350,222 | B2 | 2/2002 | Susnjara |
| 6,402,443 | B1 | 6/2002 | Hoppe |
| 6,656,234 | B2 | 12/2003 | Dexter et al. |

(Continued)

OTHER PUBLICATIONS

International Search Report and Written Opinion of PCT Application No. PCT/US09/47848 filed on Jun. 18, 2009.

(Continued)

*Primary Examiner* — Ryan Jarrett
(74) *Attorney, Agent, or Firm* — Richard T. Ogawa; Ogawa P.C.

(57) ABSTRACT

A method of designing and manufacturing a solid-state electrochemical battery cell for a battery device. The method includes building a database of a plurality of first characteristics of a solid-state cells for a battery device and determining at least a third characteristic of the solid-state cell for a given application. The method also includes selecting at least one material of the solid-state electrochemical battery cell, the selected material being from the plurality of first characteristics and forming a plurality of factorial combinations of each component using the selected plurality of first characteristics to derive a respective plurality of solid-state electrochemical battery cells. The method performs a design optimization process for the third characteristic. A step of identifying an optimal design of the second characteristics with the selected first characteristics for each solid-state electrochemical battery cell from the plurality of solid-state cells is included.

18 Claims, 9 Drawing Sheets

U.S. PATENT DOCUMENTS

| | | | |
|---|---|---|---|
| 6,884,333 | B2 | 4/2005 | Landau |
| 6,924,164 | B2 | 8/2005 | Jenson |
| 6,962,823 | B2 | 11/2005 | Empedocles et al. |
| 6,982,132 | B1 | 1/2006 | Goldner et al. |
| 7,107,193 | B1 | 9/2006 | Hummel et al. |
| 7,194,801 | B2 | 3/2007 | Jenson et al. |
| 7,294,209 | B2 | 11/2007 | Shakespeare |
| 7,315,789 | B2 | 1/2008 | Plett |
| 7,361,327 | B2 | 4/2008 | Tumas et al. |
| 7,490,710 | B1 | 2/2009 | Weskamp et al. |
| 7,553,584 | B2 | 6/2009 | Chiang et al. |
| 7,579,112 | B2 | 8/2009 | Chiang et al. |
| 7,618,742 | B2 | 11/2009 | Kaplin et al. |
| 7,625,198 | B2 | 12/2009 | Lipson et al. |
| 7,945,344 | B2 * | 5/2011 | Wang et al. ................... 700/103 |
| 2002/0120906 | A1 | 8/2002 | Xia et al. |
| 2002/0169620 | A1 | 11/2002 | Spotnitz et al. |
| 2003/0064292 | A1 | 4/2003 | Neudecker et al. |
| 2003/0068559 | A1 | 4/2003 | Armstrong et al. |
| 2003/0082446 | A1 | 5/2003 | Chiang et al. |
| 2003/0099884 | A1 | 5/2003 | Chiang et al. |
| 2003/0108800 | A1 | 6/2003 | Barbarich |
| 2004/0131761 | A1 | 7/2004 | Shakespeare |
| 2004/0131937 | A1 | 7/2004 | Chen et al. |
| 2004/0144321 | A1 | 7/2004 | Grace et al. |
| 2004/0151985 | A1 | 8/2004 | Munshi |
| 2004/0258851 | A1 | 12/2004 | Selvamanickam et al. |
| 2005/0114105 | A1 | 5/2005 | Barber |
| 2005/0244580 | A1 | 11/2005 | Cok et al. |
| 2006/0138350 | A1 | 6/2006 | Banine et al. |
| 2006/0156978 | A1 | 7/2006 | Lipson et al. |
| 2007/0110892 | A1 | 5/2007 | Awata et al. |
| 2007/0218329 | A1 * | 9/2007 | Keith et al. ................... 429/24 |
| 2008/0118782 | A1 | 5/2008 | Heller et al. |
| 2008/0187832 | A1 | 8/2008 | Takezawa et al. |
| 2009/0061090 | A1 | 3/2009 | Negishi |
| 2009/0157369 | A1 | 6/2009 | Li et al. |
| 2009/0217876 | A1 | 9/2009 | Epstein |
| 2009/0304906 | A1 | 12/2009 | Suduo et al. |
| 2009/0326696 | A1 * | 12/2009 | Wang et al. ................... 700/103 |
| 2010/0015361 | A1 | 1/2010 | Negishi |
| 2010/0035152 | A1 * | 2/2010 | Sastry et al. ............... 429/218.1 |
| 2010/0082142 | A1 | 4/2010 | Usadi et al. |
| 2010/0190051 | A1 | 7/2010 | Aitken et al. |
| 2011/0165326 | A1 | 7/2011 | Little et al. |
| 2011/0202159 | A1 * | 8/2011 | Wang et al. ................... 700/98 |
| 2011/0217578 | A1 | 9/2011 | Albano et al. |
| 2011/0301931 | A1 | 12/2011 | Gering |
| 2012/0040233 | A1 | 2/2012 | Kim et al. |
| 2012/0058280 | A1 | 3/2012 | Chung et al. |

OTHER PUBLICATIONS

Salvador Aceves et al., "Computer Modeling in the Design and Evaluation of Electric and Hybrid Vehicles", 11th Annual National Educator's Workshop Standard Experiments in Engineering Materials, Science, and Technology, Oct. 27-30, 1996, 12 pages retrieved from the Internet: <<http://www.osti.gov/bridge/servlets/purl/381678-Unwv9F/webviewable/381678.pdf>>, Lawrence Livermore National Laboratory, Los Alamos, New Mexico.

Y. H. Chen et al., "Selection of Conductive Additives in Li-Ion Battery Cathodes: A Numerical Study", Journal of The Electrochemical Society, 2007, pp. A978-A986, vol. 154 No. 10, The Electrochemical Society.

Chia-Wei Wang et al., "Mesoscale Modeling of a Li-Ion Polymer Cell," Journal of The Electrochemical Society, 2007, pp. A1035-A1047, vol. 154 No. 11, The Electrochemical Society.

Marc Doyle et al., "Computer Simulations of a Lithium-Ion Polymer Battery and Implications for Higher Capacity Next-Generation Battery Designs", Journal of The Electrochemical Society, 2003, pp. A706-A713, vol. 150 No. 6, The Electrochemical Society.

Gerbrand Ceder et al., "Computational Modeling and Simulation for Rechargeable Batteries", MRS Bulletin, Aug. 2002, pp. 619-623.

International Search Report and Written Opinion of PCT Application No. PCT/US09/47846 filed on Jun. 18, 2009.

Office Action and List of References cited by the Examiner for U.S. Appl. No. 13/292,663 mailed Aug. 2, 2012 from the United States Patent and Trademark Office.

* cited by examiner

COMPUTER AIDED SOLID STATE BATTERY DESIGN METHOD AND MANUFACTURE OF SAME USING SELECTED COMBINATIONS OF CHARACTERISTICS

CROSS-REFERENCES TO RELATED APPLICATIONS

The present application incorporates by reference, for all purposes, the following: U.S. patent application Ser. No. 13/086,825, filed Apr. 14, 2011, U.S. patent application Ser. No. 13/252,144, filed Oct. 3, 2011, U.S. patent application Ser. No. 13/283/524, filed Oct. 27, 2011, U.S. Pat. No. 7,945,344, filed Jun. 15, 2009, and U.S. patent application Ser. No. 12/334,170, filed Dec. 12, 2008.

BACKGROUND OF THE INVENTION

This invention relates to the use of computer-aided approach to design batteries. More particularly, the present invention provides a method and system for design of electrochemical battery cells by selected one or more applications that and then deriving design features of the electrochemical battery cells for the application. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, tablet computers, video cameras, and the like), power tools, power supplies for military use (communications, lighting, imaging and the like), power supplies for aerospace applications (power for satellites and micro air vehicles), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

Conventional battery design has been performed by an empirical approach. Designers propose specifications of a battery design, make batteries accordingly in a small research and development environment, and test the performance of the batteries. This process is iterated for incremental improvement of battery performances. Furthermore, the identified optimal design for one application usually does not apply to others. In other words, the whole empirical, iterative, costly and time-consuming design process needs to be repeated for different applications.

A pioneering computer aided engineering approach using multiphysics modeling and simulations has recently been proposed for battery design (Wang et al. U.S. Pat. No. 7,945,344 B2), and assigned to Sakti3, Inc. of Ann Arbor, Mich., which is hereby incorporated by reference in its entirety. This computation-based approach reduces time and investment required for battery design significantly. Although highly successful, the approach can still be improved.

From the above, techniques for improving battery designs and the manufacture of such design are desirable.

BRIEF SUMMARY OF THE INVENTION

According to the present invention, techniques related to the use of computer-aided approach to design batteries are provided. More particularly, the present invention provides a method and system for design of electrochemical battery cells by selected one or more applications that and then deriving design features of the electrochemical battery cells for the application. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, tablet computers, video cameras, and the like), power tools, power supplies for military use (communications, lighting, imaging and the like), power supplies for aerospace applications (power for satellites and micro air vehicles), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

In a specific embodiment, the present invention provides a method of designing and manufacturing a solid-state electrochemical cell for a battery device. The method includes building a database of a plurality of first characteristics of solid-state cells for a battery device and determining at least a third characteristic of the solid-state cell for a given application. The method also includes selecting at least one material of the solid-state electrochemical battery cells, the selected material being from the plurality of first characteristics and forming a plurality of factorial combinations of each component using the selected plurality of first characteristics to derive a respective plurality of solid-state electrochemical battery cells. The method performs a design optimization process for the third characteristic. A step of identifying an optimal design of the second characteristics with the selected first characteristics for each solid-state electrochemical battery cell from the plurality of solid-state cells is included. The method includes using the optimal design for manufacture of a battery device.

Benefits are achieved over conventional techniques. In one or more embodiments, the present method and system takes an unconventional approach to design an electrochemistry or use of other materials for a selected battery architecture, which is conventionally an ending point and not a starting point for a design process. In a preferred embodiment, the present method and system uses design parameters for a selected application for a design of an electrochemical battery cell. Accordingly, we have been able to systematically produce a cost effective design and manufacturing process for a selected application to meet targets such as performance, reliability, safety, lifecycle, reclamation and reuse, cost, and other factors. According to the present invention, conventional computer software and hardware can be used for computer-aided design of selecting one or more electro-chemistries (anode/cathode and electrolyte) for a selected design architecture. In a preferred embodiment, the present method and system can simulate design and processing such as packing in three dimensions, using computer aided hardware and analysis techniques such as mesh generation with irregular geometric objects with memory sizes of 32 gigabyte and greater, and processing speeds of 3 gigahertz and greater. In a preferred embodiment, the present method and system eliminates trial and error in design of a battery, which is cumbersome and inefficient. Time and costs are reduced using the present method and system. Depending upon the specific embodiment, one or more of these benefits may be achieved.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

According to the present invention, techniques related to the use of computer-aided approach to design batteries are provided. More particularly, the present invention provides a method and system for design of electrochemical battery cells by selected one or more applications that and then deriving design features of the electrochemical battery cells for the application. Merely by way of example, the invention has been provided with use of lithium based cells, but it would be recognized that other materials such as zinc, silver, copper and nickel could be designed in the same or like fashion. Additionally, such batteries can be used for a variety of applications such as portable electronics (cell phones, personal digital assistants, music players, tablet computers, video cameras, and the like), power tools, power supplies for military use (communications, lighting, imaging and the like), power supplies for aerospace applications (power for satellites and micro air vehicles), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

In a specific embodiment, the present invention provides a method of designing and manufacturing a solid-state electrochemical cell for a battery device. The method includes building a database of a plurality of first characteristics of solid-state cells for a battery device and determining at least a third characteristic of the solid-state cell for a given application. The method also includes selecting at least one material of the solid-state electrochemical battery cells, the selected material being from the plurality of first characteristics and forming a plurality of factorial combinations of each component using the selected plurality of first characteristics to derive a respective plurality of solid-state electrochemical battery cells. The method performs a design optimization process for the third characteristic. A step of identifying an optimal design of the second characteristics with the selected first characteristics for each solid-state electrochemical battery cell from the plurality of solid-state cells is included. The method includes using the optimal design for manufacture of a battery device.

Benefits are achieved over conventional techniques. In one or more embodiments, the present method and system takes an unconventional approach to design an electrochemistry or use of other materials for a selected battery architecture, which is conventionally an ending point and not a starting point for a design process. In a preferred embodiment, the present method and system uses design parameters for a selected application for a design of an electrochemical battery cell. Accordingly, we have been able to systematically produce a cost effective design and manufacturing process for a selected application to meet targets such as performance, reliability, safety, lifecycle, reclamation and reuse, cost, and other factors. According to the present invention, conventional computer software and hardware can be used for computer-aided design of selecting one or more electro-chemistries (anode/cathode and electrolyte) for a selected design architecture. In a preferred embodiment, the present method and system can simulate design and processing such as packing in three dimensions, using computer aided hardware and analysis techniques such as mesh generation with irregular geometric objects with memory sizes of 32 gigabyte and greater, and processing speeds of 3 gigahertz and greater. In a preferred embodiment, the present method and system eliminates trial and error in design of a battery, which is cumbersome and inefficient. Time and costs are reduced using the present method and system. Depending upon the specific embodiment, one or more of these benefits may be achieved.

Figure 1:
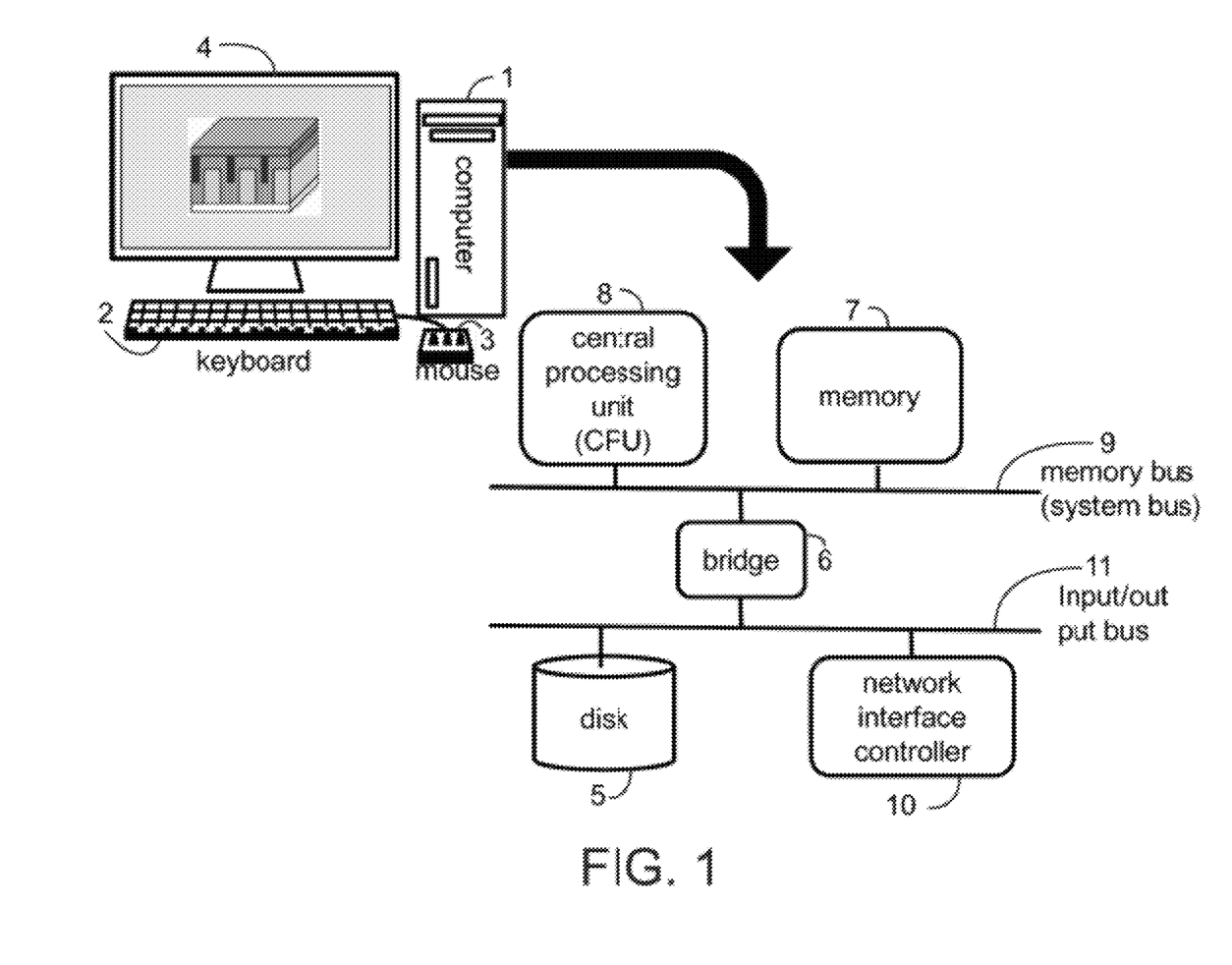
FIG. 1 is a simplified diagram of a computer aided system for designing electrochemical battery cells.

FIG. 1 illustrates a computer system for computer-aided design for electrochemical battery cell, wherein a computer 1, responds to inputs from keyboard 2, and/or other digitizing input device such as a light pen, or a mouse 3, and displays designs of the three-dimensional electrochemical battery cell on the graphical display device 4. This diagram is merely an illustration and should not unduly limit the scope of the claims herein. One of ordinary skill in the art would recognize many variations, modifications, and alternatives.

Figure 1A:
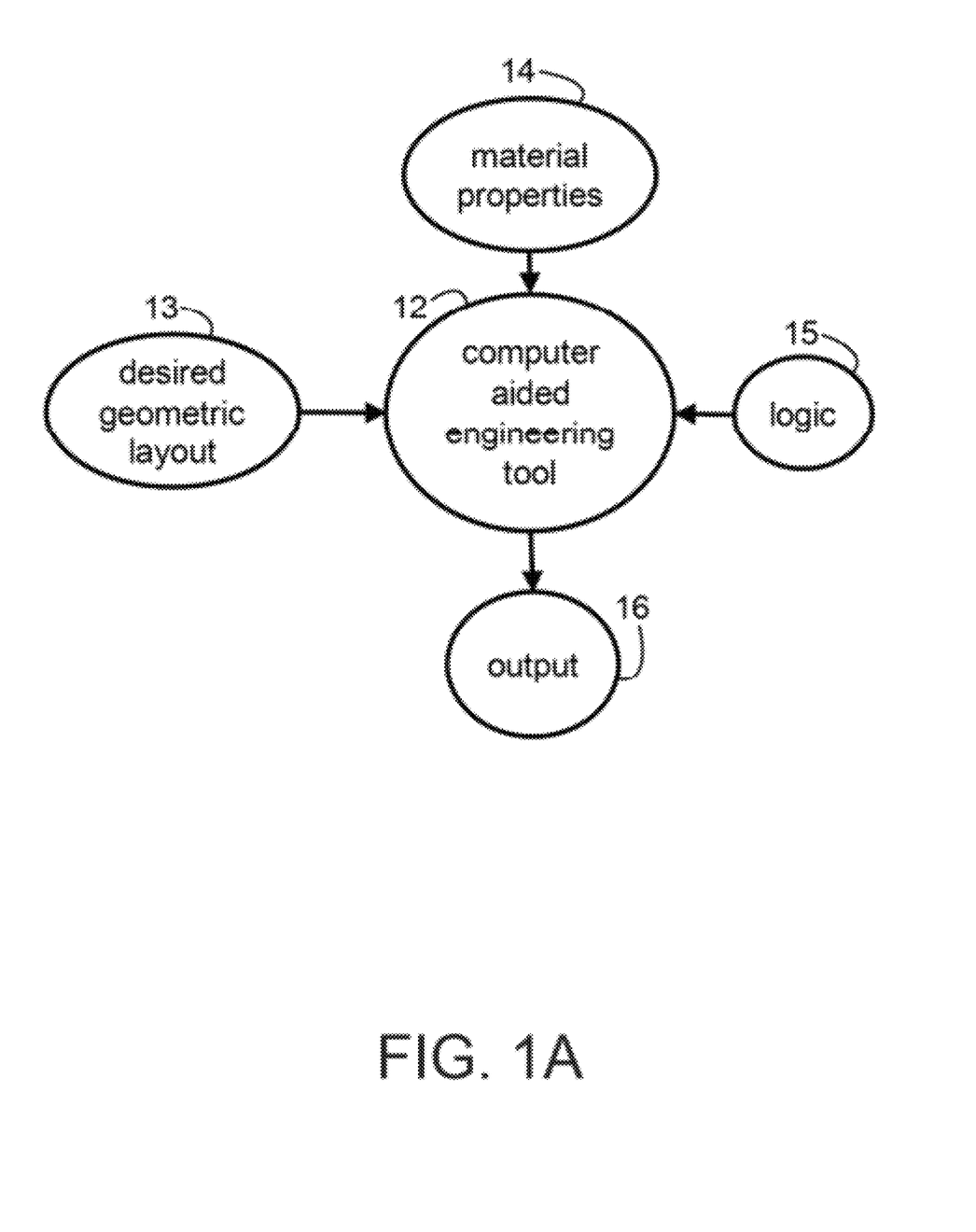
FIG. 1A is a simplified block diagram of a computer aided analysis tool according to an embodiment of the present invention.

FIG. 1A depicts the tool 12, of the present invention regarding computer-aided process of a three-dimensional electrochemical battery cell, wherein all of the programs for generating the geometric layout, the logic, and solving required equations are integrated. This diagram is merely an illustration and should not unduly limit the scope of the claims herein. One of ordinary skill in the art would recognize many variations, modifications, and alternatives. The desired geometric layout 13, is generated from the database and is processed by the computer graphics program. The material properties 14 are input of material properties. The logic 15, underlies the behavior of the materials. Then, the operation of the three-dimensional electrochemical battery cell is simulated based on the information gathered by this computer aided design tool, and is output to the database structure 16.

Figure 1B:
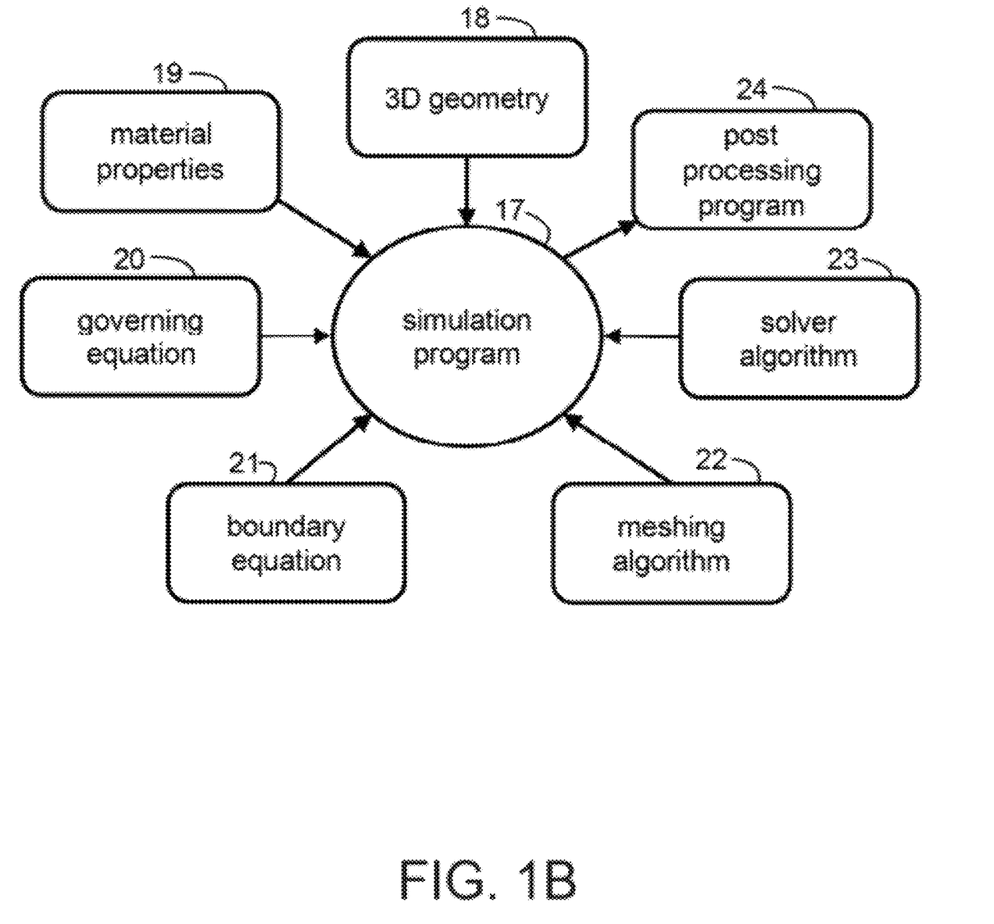
FIG. 1B is a simplified illustration of a simulation program used as an engine of the present invention.

FIG. 1B illustrates the simulation program used as an engine of the present invention. This diagram is merely an illustration and should not unduly limit the scope of the claims herein. One of ordinary skill in the art would recognize many variations, modifications, and alternatives. The program integrates the input data, the logic, meshing algorithm, solving algorithm, and the post-process algorithm together. This simulation program could be obtained commercially or built in-house. The input data includes the geometric information 18 and the material properties 19. The governing equations 20 and boundary equations 21 are chosen based on the underlying logic for the material behaviors. The meshing algorithm 22 chooses the order of the governing and boundary equations and provides the degree of the approximation to the real material behaviors. The solver algorithm 23 provides the efficiency and accuracy of the end results. The post-process algorithm 24 provides showing the computational results, and showing results in terms graphics', charts', or tables' forms.

Figure 1C:
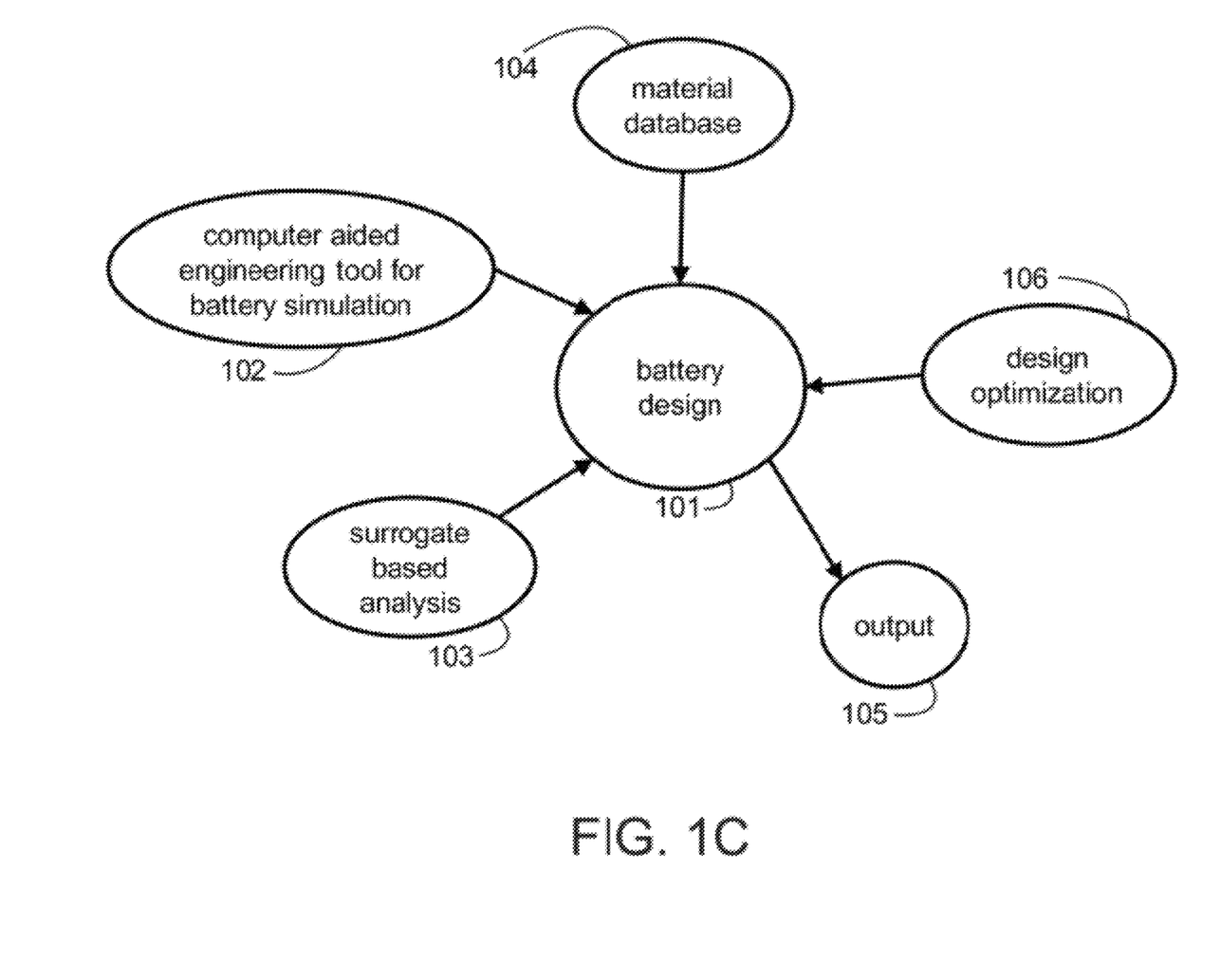
FIG. 1C is a simplified illustration of simulation program modules used in the battery design process.

FIG. 1C illustrates the simulation program modules used to design batteries in the present invention. This diagram is merely an illustration and should not unduly limit the scope of the claims herein. One of ordinary skill in the art would recognize many variations, modifications, and alternatives. The program integrates modules including surrogate model as 103 in FIG. 1C, computer aided engineering tool for battery simulation as 102 in FIG. 1C, material database as 104 in FIG. 1C, and design optimization as 106 in FIG. 1C. The output as 105 in FIG. 1C is the resulted battery design.

Figure 2:
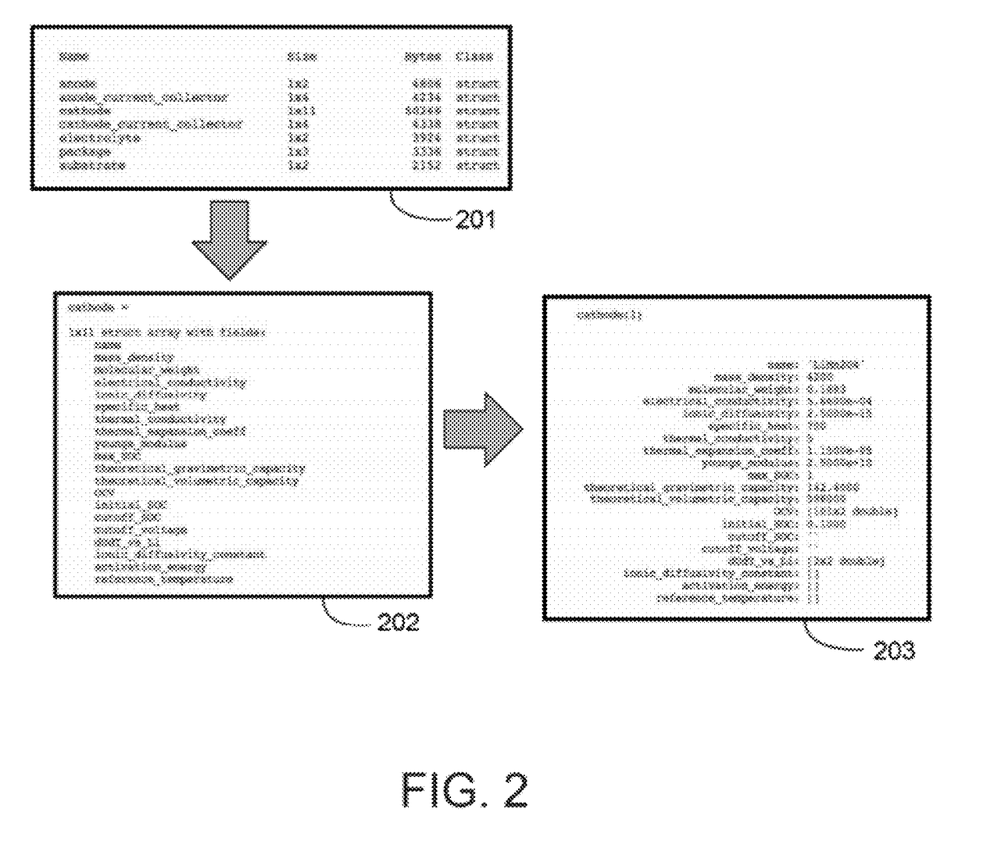
FIG. 2 is a simplified illustration of the material database used to store the first characteristics of electrochemical battery cells.

FIG. 2 illustrates the database used for the first characteristics of solid-state electrochemical battery cells. The database is categorized by solid-state electrochemical battery cell components including anode, anode current collector, cathode, cathode current collector, electrolyte, package and substrate as 201 in FIG. 2. Under each category, there are various choices of materials to select from. For example, 11 different cathode materials are available for selection in the illustration and the available names of the material properties are shown as 202 in FIG. 2. The information of material properties is stored under each entry of the material. For example, the first cathode material properties are listed as 203 in FIG. 2.

Figure 3:
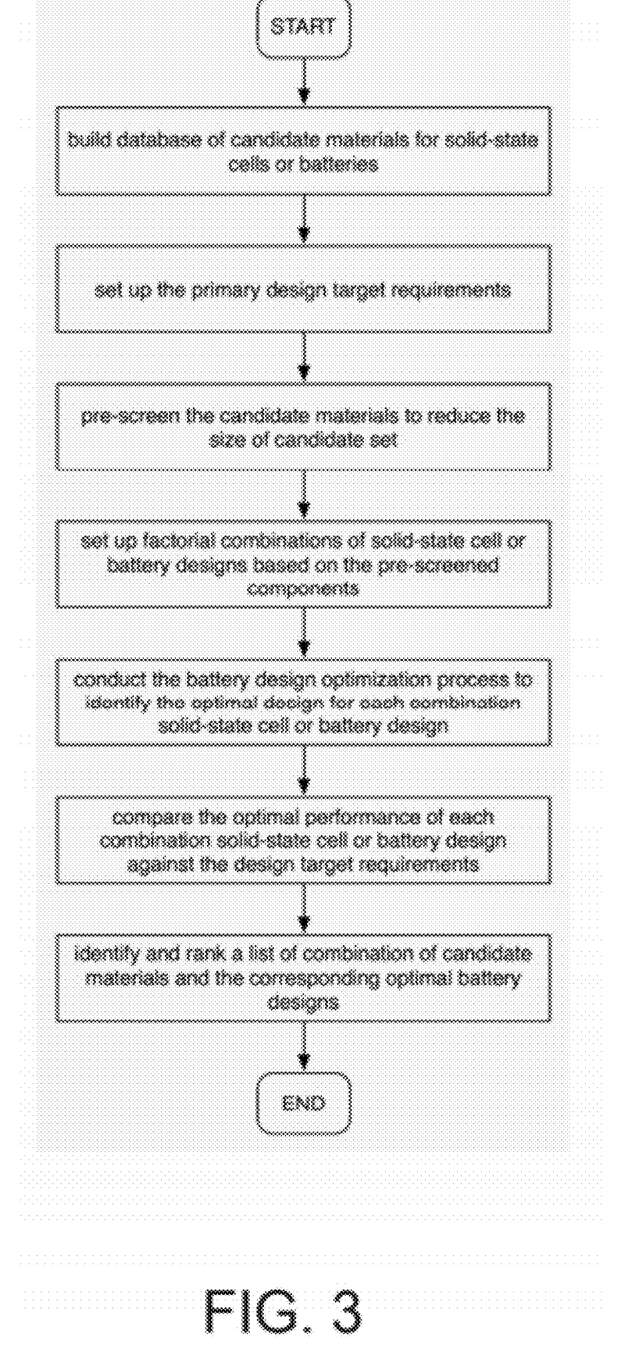
FIG. 3 is a flow diagram of the computer aided design process to identify an optimal battery design.

FIG. 3 illustrates the method for designing electrochemical battery cells to achieve superior performance. The process starts with building a database a plurality of first characteristics of a solid-state electrochemical cells for a battery device containing candidate materials and their properties. In a specific embodiment, the database can be made using a Matlab, C programming language, or Fortran programming language, which is loaded onto memory of the computer system. In a specific embodiment, the candidate materials can include lithium, silicon, and carbon nanotube for the anode and $LiCoO_2$, $LiMn_2O_4$ and $LiFePO_4$ for the cathode. The properties may include mass density, open circuit potential, ionic diffusion coefficient, electrical conductivity, theoretical capacity, theoretical volumetric energy density, theoretical gravimetric energy density, Young's modulus, Poisson's ratio, thermal conductivity, heat capacity, thermal expansion coefficient, maximum state of discharge, and molecular weight. Of course, there can be other variations, modifications, and alternatives.

In a specific embodiment, primary design target requirements are then specified for a given application. An example of target requirements includes battery discharge modes and rates, battery volume, battery weight, and battery capacity. The target requirements are often loaded into input files in common programming language compatible ASCII format, which is read by the computer code script, which is portion of the optimization process. The input files are generally stored on a local memory of computing device. The local memory can include the hard drive, Flash drive, or the like. Of course, there can be other variations, modifications, and alternatives.

In a specific embodiment, the candidate materials are then pre-screened to reduce the size of the candidate set. Preferably, the pre-screen process identifies selected materials, and determines whether they are unsuitable. That is, the pre-screening process eliminates unsuitable materials with the consideration of the specified primary design target requirements. A material is considered unsuitable when the material is of high cost, is difficult to make for manufacturing process, or is intrinsically of low performance metrics. As an example, the starting materials are lithium metal, silicon, and carbon nanotube for the anode. After pre-screening, the resulting materials include lithium metal. Again, there can be variations.

In a specific embodiment, the selected materials for the respective solid-state electrochemical battery cell components are permuted to generate factorial combinations of the solid-state electrochemical battery cell. An example is listed as lithium metal combined with $LiCoO_2$, lithium metal combined $LiMn_2O_4$ and lithium metal combined with $LiFePO_4$.

Another example of the factorial combinations is provided in FIG. 5 which is described in detail below.

In a preferred embodiment, a design optimization process is conducted for each combination of material selection for electrochemical battery cell components. The design optimization process specifies design variables of one or more second characteristics for each component of solid-state cell or battery design and one or more third characteristics of solid-state cell or battery as optimization objectives. The second characteristics of solid-state electrochemical cell for a battery device comprise, but are not limited to, the physical dimensions (width, length, and thickness), three-dimensional feature of each component, the number of electrochemical cell unit layers and porosity. The third characteristics of solid-state electrochemical cell for a battery device comprises, but are not limited to, volume, weight, capacity, energy, power, gravimetric energy density, gravimetric power density, volumetric energy density, volumetric power density, output voltage range, total cost, maximum intercalation induced stresses, and operational temperature range. The design optimization process further sample plurality of design points in the specified design space for one or more second characteristics for each component of solid-state electrochemical battery cell design with a design of experiment (DOE) approach and conducts computer simulations of physics models of solid-state electrochemical battery cell on the design points to obtain data sets of optimization objectives of solid-state lithium cell or battery. The computer simulations use the specified primary design target requirements, such as discharge rate and battery volume or capacity, as inputs for the physics model. The obtained simulation data is used to build a surrogate model. The generated surrogate model with high accuracy is provided to an optimization solver to indentify the optimal design solution(s) of one or more second characteristics of solid-state electrochemical cell for a battery device. The optimization process using the surrogate model conducts a single or multi-objective optimization process which generates a single optimal solution or a set of optimal solutions.

In a specific embodiment, the resulted optimal designs for all the factorial combinations are compared and ranked. As an example, the optimal designs for the batteries made from three different combinations, lithium metal with $LiCoO_2$, lithium metal with $LiMn_2O_4$ and lithium metal with $LiFePO_4$, delivers different gravimetric energy densities; the battery of lithium metal with $LiMn_2O_4$ delivers the most gravimetric energy density. Therefore, the optimal design associated with lithium metal combined with LiMn$_2$O$_4$ design is selected. The identified best design is considered as the final electrochemical battery cell design.

Any of the above sequence of steps provides a method according to an embodiment of the present invention. In a specific embodiment, the present invention provides a method and system for designing a solid-state electrochemical battery cell in three dimensions. Other alternatives can also be provided where steps are added, one or more steps are removed, or one or more steps are provided in a different sequence without departing from the scope of the claims herein.

Figure 4:
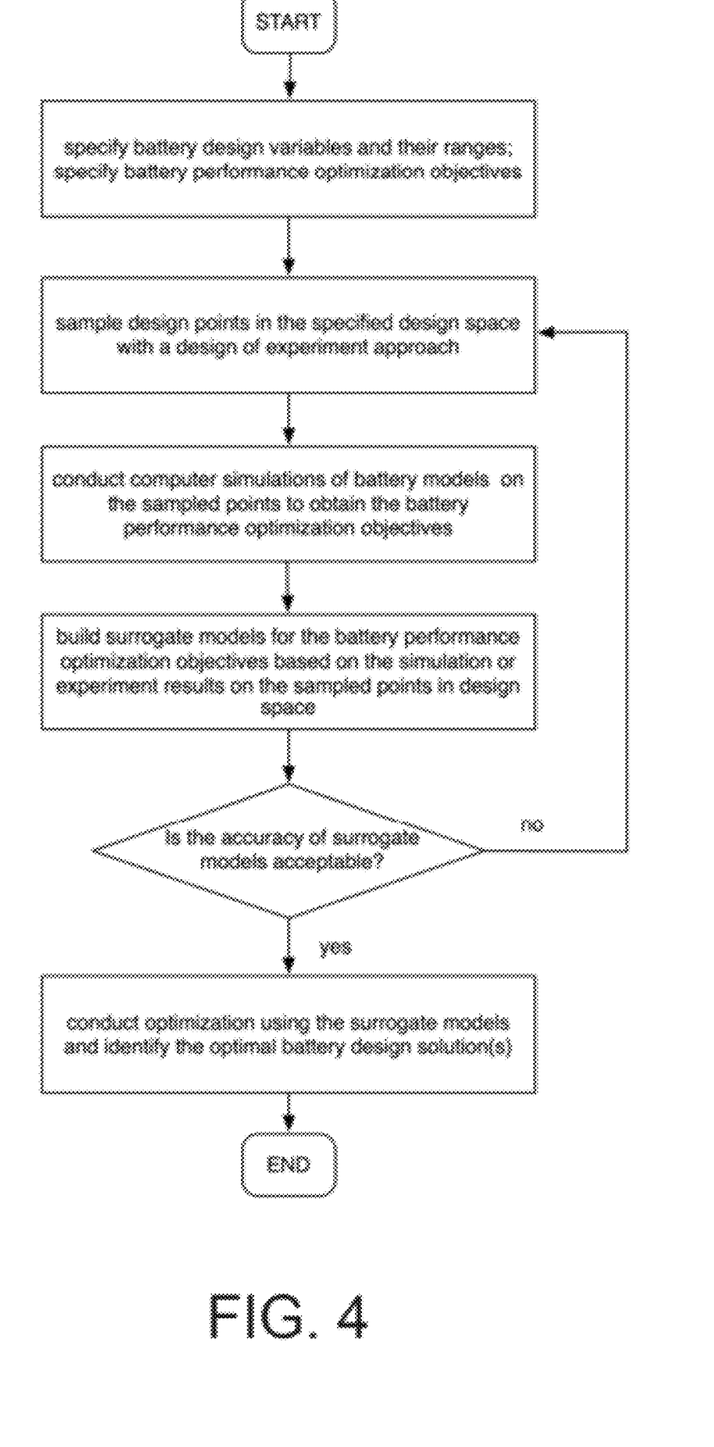
FIG. 4 is a flow diagram of a surrogate modeling process to build surrogate model for the functional relationship between design variables and objective functions.

FIG. 4 illustrates the surrogate modeling process of the present invention. This diagram is merely an illustration and should not unduly limit the scope of the claims herein. The surrogate modeling process comprises providing an upper bound and a lower bound for geometric dimensions of at least one component of the electrochemical battery cell, determining a plurality of sampling points between the upper bound and the lower bound of geometric dimensions using a design of experiment (DOE) process. The design of experiment process comprises systematically choosing plurality of design points based on one or more strategies, which include but are not limited to Latin hyper cube sampling, factorial design, face-centered-central-composite design, and D-optimal design. The surrogate modeling process also comprises determining a plurality of third characteristics for the respective sampling points using a computer aided engineering process and a plurality of parameters (e.g., application-specific primary design target requirements and the first and second characteristics of solid-state cell or battery). The surrogate model is generated for the third characteristics of the electrochemical battery cell with the geometric dimensions of electrochemical battery cell components as the independent variables. The surrogate model comprises fitting function at design points, where said fitting functions include but are not limited to polynomial responses, kriging model, radial basis neural network, and support vector machines.

EXAMPLES

Example 1

Figure 5:
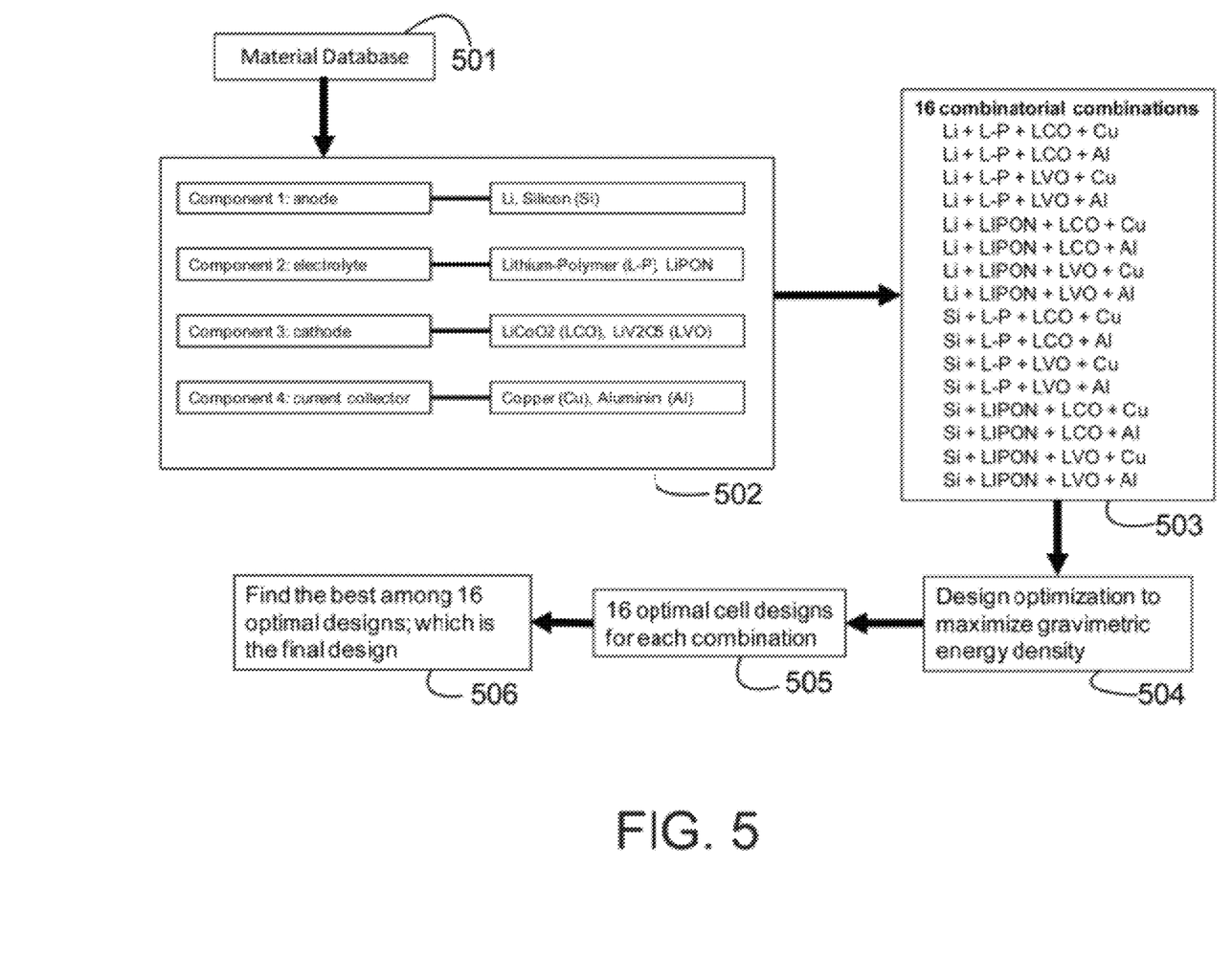
FIG. 5 is a flow diagram of the computer aided design process.

From the database as 501 in FIG. 5, two materials can be selected for each component of the electrochemical battery cell. Lithium (Li) and Silicon (Si) are selected for the anode; Lithium-Polymer (L-P) and lithium phosphorus oxynitride (LIPON) are selected for the electrolyte; LiCoO$_2$ (LCO) and LiV$_2$O$_5$ (LVO) are selected for the cathode; copper (Cu) and aluminum (Al) are selected for the current collector as 502 in FIG. 5. 16 combinations can be generated by permuting through the material choices for the components as listed in 503 in FIG. 5. For each combination, a design optimization process is performed to identify a geometric/dimension design that yields the maximum gravimetric energy density as 504 in FIG. 5. Among the resulted 16 optimal designs as 505 in FIG. 5, the best design with the largest gravimetric energy density is the final cell design as 505 in FIG. 5.

Example 2

Figure 6:
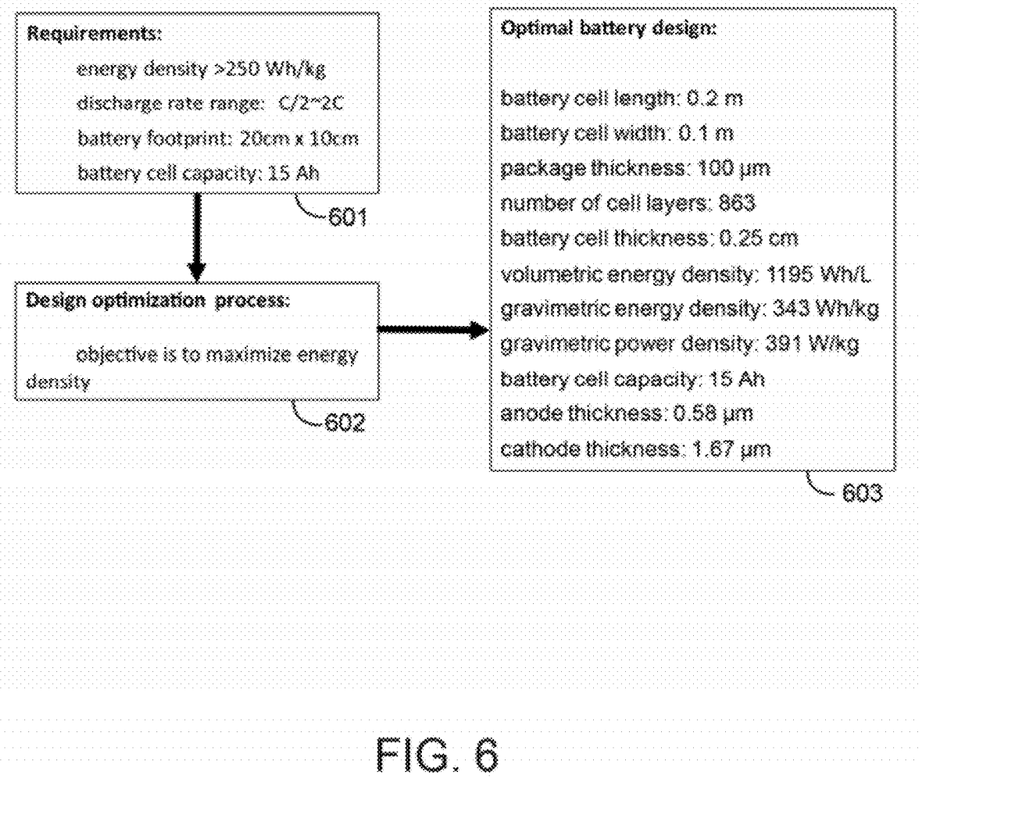
FIG. 6 is a simplified illustration of the design process for targeted application requirements.

The application is electric vehicles. The requirements from the application include 1) energy density being larger than 250 Wh/kg, 2) discharge rate ranging from C/2 to 2C, 3) battery footprint being 20 cm×10 cm, and 4) total capacity for one battery cell being 15 Ah, also listed as 601 in FIG. 6. The design optimization objective is to maximize the energy density (Wh/kg) of the battery cell for electric vehicles application as 602 in FIG. 6. By applying the process described in this invention, one can identify the optimal design with systematically chosen first characteristics (material type for each component) and intelligently optimized second characteristics (geometry and dimension) of the battery cell. The optimal design to meet the requirements is listed in 603 in FIG. 6.

Any of the above sequence of steps provides a method according to an embodiment of the present invention. In a specific embodiment, the present invention provides a method and system for designing an electrochemical battery cell in three dimensions. Other alternatives can also be provided where steps are added, one or more steps are removed, or one or more steps are provided in a different sequence without departing from the scope of the claims herein.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of designing and manufacturing a solid-state electrochemical cell for a battery device, the method comprising:
   building a database of a plurality of first characteristics of the solid-state electrochemical battery cell for a battery device, the database comprising a plurality of second characteristics;
   determining at least a third characteristic of the solid-state electrochemical battery cell for a given application;
   selecting at least one material of the solid-state electrochemical battery cell, the selected material being from the plurality of first characteristics;
   forming a plurality of factorial combinations of a component using the selected plurality of first characteristics to derive a respective plurality of solid state electrochemical battery cells;
   performing a design optimization process for the third characteristic;
   identifying an optimal design of the plurality of second characteristics with the selected first characteristics for each solid-state electrochemical battery cell from the plurality of solid-state electrochemical battery cells; and
   using the optimal design for manufacture of a battery device.

2. The method of claim 1 further outputting a plurality of optimal third characteristics for each solid state electrochemical battery cell and a plurality of optimal second characteristics, and further comprising comparing the optimal third characteristics of each solid-state electrochemical battery cell with the selected first characteristics and the corresponding optimal second characteristics for the given application.

3. The method of claim 1 further comprising ranking a list of combinations of the selected first characteristics and the selected second characteristics for each solid-state electrochemical battery cell based on one or more of the third characteristics.

4. The method of claim 1, wherein the solid-state electrochemical battery cell comprises an anode substrate, an anode current collector, an anode, electrolyte, a cathode, a cathode current collector, and a cathode substrate in sequence.

5. The method of claim 1, wherein the first characteristics of the solid-state electrochemical battery cell comprises a plurality of material types provided for the component, the plurality of material types comprising:

an anode electrode material comprising at least one of a zinc metal, a magnesium metal, a lithium metal (Li), or a lithium intercalation host material which includes a lithium titanium oxide ($Li_4Ti_5O_{12}$), a graphite (C), or a silicon (Si);

an electrolyte material overlying an anode material comprising at least one of a silver compound, AgI, $Ag_2O$, $Ag_2S$, $Ag_2Se$, $P_2O$, $P_2S$, and $P_2Se$, a lithium solid-electrolyte, lithium phosphorus oxynitride (UPON), $Li_3N$, $Li_{10}GeP_2S_{12}$, and $Li_2S$—SiS—$Li_3PO_4$ a lithium polymer-electrolyte, a lithium salt, $LiClO_4/LiPF_6$ mixed with a poly-ethylene oxide (PEO), a poly-vinylidene fluoride (PVDF), or a combination of PEO and PVDF;

a cathode electrode material overlying the electrolyte material comprising at least one of $Ag_2O$, $MgMo_6S_8$, $MgMo_6Se_8$, a magnesium intercalatible compound, a lithium intercalation layered metal oxide material, $LiCoO_2$, $LiNiO_2$, $LiV_2O_5$, $Li(Ni_xMn_yCo_{(1-x-y)})O_2$, $LiNi_xCo_yAl_{(1-x-y)}O_2$ (NCA), $LiNi_xMn_yCo_{(1-x-y)}O_2$ (NCM) where ($0<=x<1$, $0<=y<1$), a spinel material, $LiMn_2O_4$, $LiNi_xMn_{2-x}O_4$ where ($0<=x<2$) an olivine material, $LiFePO_4$, $LiCoPO_4$, or $LiNiPO_4$;

a current collector material comprising at least one of a copper (Cu), an aluminum (Al), a stainless steel, an other conductive metal, or an alloy in the form of a thin foil and bearing;

a separator material overlaying between the anode material and the cathode material, the separator material comprising at least one of a microporous polypropylene/polyethylene membrane; and a substrate material comprising at least one of a polymer, a metal, or a glass.

6. The method of claim 1, wherein the first characteristics of solid-state electrochemical battery cell further comprise a plurality of material properties of at least one composition in the solid-state electrochemical battery cell, the one component being one of a, mass density, an open circuit potential, an ionic diffusion coefficient, an electrical conductivity, a theoretical capacity, a theoretical volumetric energy density, a theoretical gravimetric energy density, Young's modulus, a Poisson's ratio, a thermal conductivity, a heat capacity, a thermal expansion coefficient, a maximum state of discharge, or molecular weight.

7. The method of claim 1, wherein the plurality of second characteristics of solid-state electrochemical battery cell comprise at least one of a plurality of physical dimensions, a width, a length, a thickness, a three-dimensional feature of a component, a number of electrochemical cell unit layers, or a porosity.

8. The method of claim 1, wherein the third characteristic of the solid-state electrochemical battery cell comprises a volume, a weight, a capacity, an energy, a power, a gravimetric energy density, a gravimetric power density, a volumetric energy density, a volumetric power density, an output voltage range, a total cost, maximum intercalation induced stresses, and an operational temperature range.

9. The method of claim 1 wherein the given application is selected from one of portable electronics, cell phones, personal digital assistants, music players, tablet computers, video cameras, power tools, power supplies for military use, communications, lighting, imaging, power supplies for aerospace applications, power for satellites, micro air vehicles, power supplies for vehicle applications, hybrid electric vehicles, plug-in hybrid electric vehicles, and fully electric vehicles, the given application further comprising at least one of a fuel cell, an other battery, an IC engine, a combustion device, a capacitor, or a solar cell.

10. The method of claim 1 further comprising a design optimization process, the design optimization process comprising:
specifying design variables of one or more second characteristics for each component of solid-state electrochemical battery cell design;
specifying one or more third characteristics of solid-state electrochemical battery cell as optimization objectives;
sampling plurality of design points in the specified design space for one or more second characteristics for each component of solid-state electrochemical battery cell design with a design of experiment (DOE) approach;
conducting computer simulations of physics models of solid-state electrochemical battery cell on the design points to obtain data sets of optimization objectives of solid-state electrochemical battery cell;
building surrogate models for optimization objectives of solid-state electrochemical battery cell based on the computer simulation or experiment results on design points;
verifying the accuracy of these surrogate models, repeating steps until the accuracy of these surrogate models is less than set criteria; and
identifying an optimal design solution of one or more second characteristics of solid-state electrochemical battery cell by conducting optimization using the surrogate models.

11. The method of claim 10, wherein the design of experiment approach comprises systematically choosing a plurality of design points based on one or more strategies, the one or more strategies being at least one of a Latin hyper cube sampling, a factorial design, a face-centered-central-composite design, or a D-optimal design.

12. The method of claim 10, wherein the conducting computer simulations of physics models of solid-state electrochemical battery cell comprises conducting computer simulations of physics models of solid-state electrochemical battery cell using numerical schema.

13. The method of claim 10, wherein the building surrogate models comprises fitting function at design points.

14. The method of claim 10 wherein the conducting optimization using the surrogate models and the identifying an optimal battery design solution comprises conducting a single or multi-objective optimization process which generates a single optimal solution or a set of optimal solutions.

15. A system for designing a battery device for a given application, the system comprising:
an input and output interface device;
a memory for storing computer readable codes for one or more application modules;
a communication interface device; and
at least one processor coupled to the memory, the input and output interface device, and the communication interface device, the processor being configured to execute the computer readable codes, the computer readable codes including:
a code directed to storing and accessing a material database of design parameters for a battery cell;
a code directed to a battery design process using surrogate models; and
a code directed to processing a candidate material performance against an application specification to determine an anode material, a cathode material, an electrolyte material, a connector material, a current collector material, and a barrier material for the battery device.

16. The system of claim 15 wherein the code directed to a battery design process using surrogate models includes a code directed to conducting computer simulations of physics models of a solid-state electrochemical battery cell, including conducting computer simulations of physics models of the solid-state electrochemical battery cell using numerical schema which include but are not limited to a finite difference method, a finite element method, a finite volume method, and a boundary element method.

17. The system of claim 15 wherein the code directed to a battery design process using surrogate models includes a code directed to fitting functions at design points, where the fitting functions include but are not limited to polynomial responses, a kriging model, a radial basis neural network, and support vector machines.

18. The system of claim 15 wherein the code directed to processing a candidate material performance against an application specification includes a code directed to conducting the single or multi-objective optimization process which generates a single optimal solution or a set of optimal solutions.

* * * * *